United States Patent [19]

Hendry

[11] Patent Number: 5,542,611
[45] Date of Patent: Aug. 6, 1996

[54] METHOD AND APPARATUS FOR FLUID COMPRESSION OF INJECTION MOLDED PLASTIC MATERIAL

[75] Inventor: James W. Hendry, Brooksville, Fla.

[73] Assignee: ICP Systems, Inc., Center Line, Mich.

[21] Appl. No.: 511,952

[22] Filed: Aug. 7, 1995

Related U.S. Application Data

[63] Continuation of Ser. No. 262,342, Jun. 20, 1994, Pat. No. 5,439,365, which is a continuation of Ser. No. 83,382, Jun. 28, 1993, abandoned, which is a continuation of Ser. No. 855,236, Mar. 23, 1992, abandoned.

[51] Int. Cl.$^6$ ........................................ B05B 1/14
[52] U.S. Cl. ........................................ 239/553.5
[58] Field of Search ................... 239/553–553.5, 239/590–590.5, 461, 468, 542, 486, 547

[56] References Cited

U.S. PATENT DOCUMENTS

| | | | |
|---|---|---|---|
| 2,308,353 | 1/1943 | Bowen | 239/553.5 X |
| 4,131,665 | 12/1978 | Bodson et al. | 264/572 |
| 4,389,358 | 6/1983 | Hendry | 264/45.1 |
| 4,917,594 | 4/1990 | Gellert et al. | 425/549 |
| 5,054,689 | 10/1991 | Hunerberg et al. | 239/412 |
| 5,069,858 | 12/1991 | Hendry | 264/572 |
| 5,112,212 | 5/1992 | Akselrud et al. | 425/557 |
| 5,200,127 | 4/1993 | Nelson | 264/85 |
| 5,238,378 | 8/1993 | Gellert | 425/130 |
| 5,252,287 | 10/1993 | Fries | 264/572 |
| 5,273,417 | 12/1993 | Nelson | 425/130 |
| 5,273,707 | 12/1993 | Carroll | 264/572 |
| 5,286,184 | 2/1994 | Nakayama | 425/130 |
| 5,295,801 | 3/1994 | Sugiyama et al. | 425/130 |
| 5,302,339 | 4/1994 | Baxi et al. | 264/572 |
| 5,306,134 | 4/1994 | Gill | 425/566 |
| 5,344,596 | 9/1994 | Hendry | 264/40.3 |

FOREIGN PATENT DOCUMENTS

| | | | |
|---|---|---|---|
| 566068 | 8/1977 | U.S.S.R. | 239/590.5 |

*Primary Examiner*—Andres Kashnikow
*Assistant Examiner*—Lesley Morris
*Attorney, Agent, or Firm*—Harness, Dickey & Pierce PLC

[57] ABSTRACT

A mold apparatus and method is used to form a solid injection molded plastic part having no internal voids, a Class A finish, a sink-free exterior appearance surface, and unevenly distributed structural detail extending from the opposite surface, the detail including free-standing reinforcement ribs, attachment bosses, and the like. A charge of hot melted thermoplastic and pressurized gas are sequentially injected into a mold cavity defining the shape of the desired part, the plastic not filling the cavity and being simultaneously received in shaped recesses and grooves which form the structural detail. The pressurized gas forces the hot plastic from one mold half against the other mold half, and into the recesses and grooves, and is maintained during cooling. A gas seal is formed by the plastic to prevent gas in the mold cavity from reaching the finished exterior surface of the part during shrinkage of the plastic. Gas inlets and plastic volume areas cooperate with rib forming chambers to enhance resin distribution in the cavity. Importantly, the gas can be reclaimed, such as for recirculation and cooling.

7 Claims, 4 Drawing Sheets

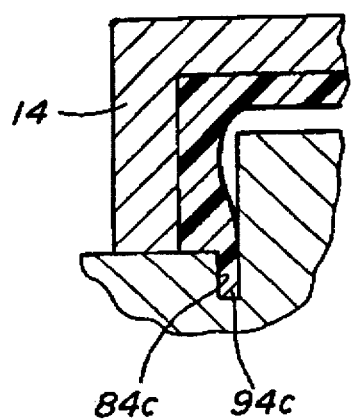
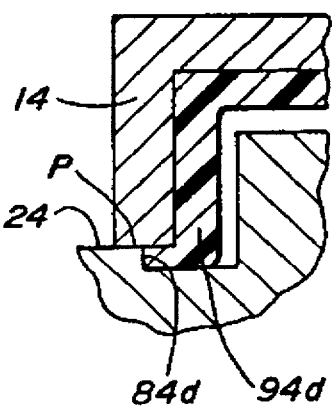
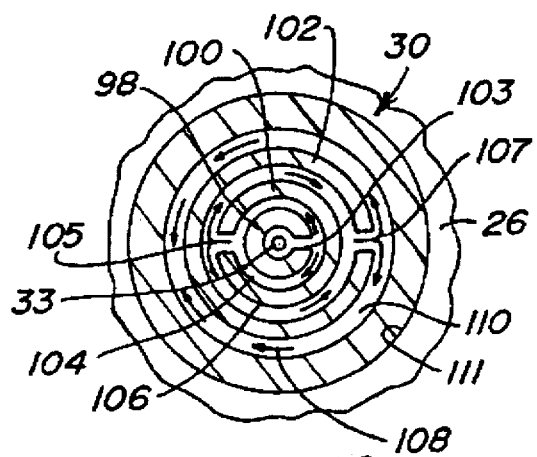
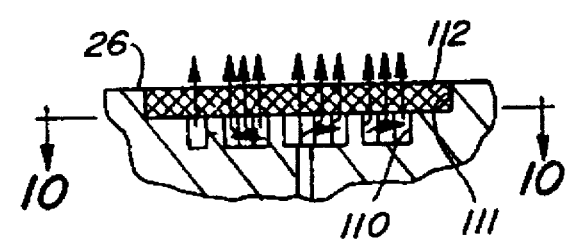
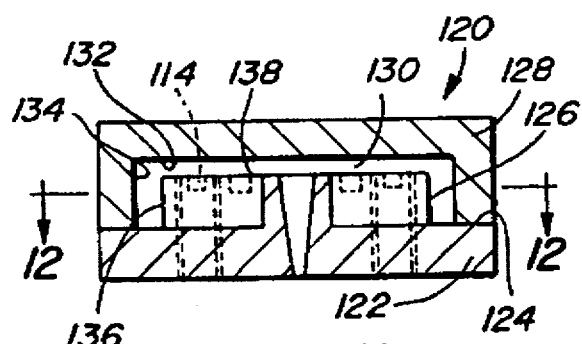
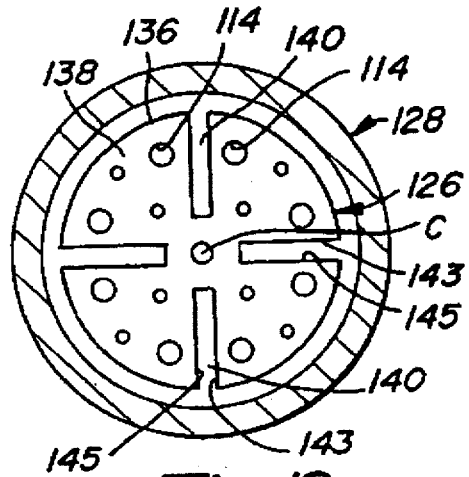
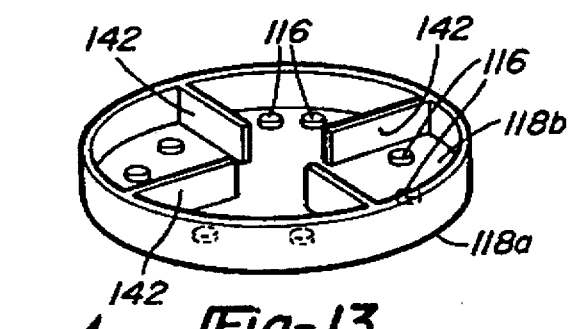

METHOD AND APPARATUS FOR FLUID COMPRESSION OF INJECTION MOLDED PLASTIC MATERIAL

This is a continuation of U.S. patent application Ser. No. 08/262,342, filed Jun. 20, 1994, now U.S. Pat. No. 5,439.365, which is a continuation of U.S. patent application Ser. No. 08/083,382 filed Jun. 28,1993, now abandoned, which is a continuation of U.S. patent application Ser. No. 07/855,236 filed Mar. 23, 1992 now abandoned.

BACKGROUND OF THE INVENTION

The present invention relates to a method and apparatus for fluid compression of flowable plastic material following injection of the plastic into a mold cavity to form a solid injection molded part having no internal voids, that is substantially strain free, and has a Class A finish and sink-free surface.

Injection molds typically comprise stationary and moving mold halves (i.e., the core side and cavity side) which are closed and clamped together to form a mold cavity therebetween for shaping articles from thermoplastic compositions. The thermoplastic is heated into a molten condition and injected under pressure through a nozzle and into the mold cavity by means of a screw ram. Injection pressures of 2,000 to 10,000 psi are common at the gate locations. The plastic is allowed to cool to sufficiently harden the thermoplastic whereupon the mold is opened and the hardened articles removed.

A traditional plastic molding problem is the formation of surface distortions or "sink marks" on the appearance side caused by ribs or bosses on the backside of a part resulting from the volume contraction (i.e., shrinkage) of the plastic during cooling. Further, warpage or part distortion can result from the high injection pressures used to fill the cavity, the pack out pressure, or from an uneven pressure gradient resulting from the injection pressure at the gate being higher than the pressures at the extreme ends of the molding. High injection pressures can cause strain marks or molded-in strain in the hardened article, resulting in warpage at once, or over a period of time after molding, or if the end use of the molding is in a high temperature area. When ribs are formed in the molding, due to a shrinkage differential, the wall thickness versus rib configuration can cause the ribs to buckle or bend the molding. In large projected area moldings where the plastic cannot flow from the gate to the end of the molding, hot runner molds are needed and high clamping forces (e.g., 1,000 to 5,000 tons) are required to hold the mold halves together. These molds are costlier to build, and the runners can add a weld line to the product. Machines which can provide these high clamping forces are costly to operate.

In what has come to be known as "gas assisted injection molding" an inert gas is injected through the plastic injection nozzle and directly into the thick areas of the melted thermoplastic to create hollow sections in the part. With the gas assisted molding process, sink marks and warpage can be minimized and possibly eliminated. The gas is directed through a hollow (i.e., gas channel) of the material formed between the surface of the part and a backside detail, such as a rib. If so, the base of the rib must be made thicker to help direct the gas channel, which is just the opposite of normal design practice with plastic where ribs are made as thin as possible to try and eliminate shrinkage. With the gas channel at the base of a rib, material will shrink away from the inside surface of the channel as the molded part cools because the material is the hottest at the center of the section. Therefore, as the plastic part shrinks during cooling, the sink mark on the visible outside surface is minimized.

A disadvantage in such gas assisted molding operations is that the gas pressure within the channels must be released prior to opening the mold, which normally requires the costly post-molding steps of venting the pressurized gas to atmosphere and then sealing or finishing the vent hole. Oftentimes sealing of this vent hole is needed, such as where the appearance or function of the part is affected, or to obviate the possibility of the part contaminating various chemical baths during secondary operations, such as chrome plating or painting.

Additionally, the possibility of achieving a Class A surface is inhibited by shadow marks caused by gas holes in the thicker areas of the molding and gas permeation caused by the gas not being retained in the thicker areas and overflowing into the wall thickness of the molding. This causes thinning and weakening of the wall, raised areas, and blush marks.

In the gas assisted process, the gas used during the molding operation can be recovered to some extent but the chances are it will be full of volatiles from the molded polymer which would need to be removed. However, there are dangers in compressing inert gas with a volatile gas (e.g., fire).

Additionally, with gas assistance, costly apparatus is needed in the form of gas compression units, nozzles, pins and the like to introduce the gas into the molding. Further, to operate these units at the high pressures needed (e.g., 9,000 psi) is energy costly, the gas used and lost is costly, and the cost of maintenance is high.

Injection molding of parts utilizing a pressurized gas source is shown in "Injection Mold Method and Apparatus," published 14 Jun. 1990 as PCT Publication WO 90/06220, the specification being specifically incorporated herein by reference. While this process is suitable for molding articles of the type shown therein, there is always a need for improvements in forming low cost articles.

The primary objects of this invention are to provide a method and apparatus which enhances the low cost production of a plastic molded part which is stress-free, has a Class A surface condition, is free of "sink-marks" or "blush-marks," has no gas internally in the part or voids internally of the plastic, avoids permeation and witness lines, does not require venting the fluid pressure within the molded part, provides a constant gas pressure across an inner surface of molten plastic used to form the mold part, and allows for the reclaiming of the fluid (i.e., gas) with reduced volatile content for reuse in the process.

Yet another object of this invention is provision of mold apparatus which eliminates the need for gas channels to communicate gas to remote locations to form free-standing bosses, stiffeners, and other structural details.

A further object of this invention is provision of an injection molded, gas compressed, dimensionally stable, thermoplastic part having reduced wall thicknesses, without the need for either reinforcement ribs, as desired, or internal gas cavities.

Yet another object of this invention is provision of a process that is efficient, requires lesser pressure to form a part, reduces the clamping forces needed to retain the molds together against the pressure, obviates venting, and advantageously uses at least part of the forming pressure to assist in ejection of the finished part upon opening of the mold portions.

A further object of this invention is provision of a self-sealing arrangement during molding and curing to prevent the forming gas from either migrating around the thermoplastic to force the molten plastic away from the mold cavity surface used to form the finished surface or escaping across the parting line of mold sections and outwardly from the mold cavity.

Still a further object of this invention is provision of fluid inlets which are efficient to provide a uniform gas pressure across the inner surface of the injected thermoplastic and are less costly than conventional nozzles and injection valves.

A further object of this invention is provision of a gas recirculation arrangement that enhances the cooling of the part.

SUMMARY OF THE INVENTION

A method of and apparatus for fluid compression of injection molded plastic material are provided to form a strain free part having no internal voids, a Class A finish, and sink-free surface. The apparatus comprises stationary and movable mold portions which are moved between an open position and a closed position to define a mold cavity of the shape of the desired part, at least one plastic injection valve for injecting melted plastic into the mold cavity, and at least one gas inlet valve for introducing pressurized gas into the cavity. The mold portions close to form a parting line and define confronting mold cavity surfaces and the stationary mold portion is provided with one or more gas inlets that open into the mold cavity.

In accordance with the invention, the plastic can be injected into the mold cavity through either of the mold portions or laterally through the parting line but is illustrated as being centrally injected through the stationary mold portion. Pressurized inert gas, such as nitrogen, is introduced through the gas inlets and into the mold cavity following the injection of plastic, and operates to uniformly force the molten thermoplastic away from the stationary mold portion against the movable mold portion to form the finished outer surface of the part.

To prevent gas from escaping from the mold cavity (such as via the parting line) and from migrating around the inner surface of the injected plastic to the finished outer surface of the part, a continuous recess is formed in the mold surfaces of either the cavity or core sides and in encircling relation to the gas inlets, and a pair of generally concentric continuous grooves are formed outside of the mold cavity and in the parting line defined by the confronting surfaces of the mold portions. The recess receives thermoplastic forced thereinto during the injection step and the pressurized gas acts to continuously force the thermoplastic against a wall of the recess during cooling and shrinkage of the thermoplastic whereby to form a seal ring that extends from the inner surface of the molding and prevents gas from escaping from the cavity. The inner groove is adapted to provide a low pressure path, such as for controlled recycling of the gas from the mold cavity, and the outer groove is sized to receive an O-ring and to form a seal about the inner groove.

Preferably, and in accordance with this invention, the stationary portion (i.e., the core side) can include a plurality of recesses to form free-standing bosses, or an upwardly extending core body having a plurality of rib forming chambers that fill with thermoplastic. The chambers form ribs on the inner side of the part and these ribs can be continuous, interrupted, and used in combination with the recesses to form free-standing bosses. Additionally, the walls of the rib-forming chambers can be provided with a stepped portion to form an increased volume area for the plastic to flow into to drive the plastic outwardly to inhibit shrinkage of the part and separation of its exterior appearance surface from contact with the mold cavity surface.

Advantageously, the method and apparatus herein allows formation of free-standing bosses and ribs without the need for gas channels which extend thereto, as is needed with traditional gas assisted injection molding. This allows flexibility in design whereby all ribs that are not needed for strengthening the molding but are only there to inhibit shrinkage in remote areas of thick sections of the mold, can be eliminated.

Further, moldings can be made using low pressures and low clamping forces, and eliminating the need for hot runners.

Advantageously, the pressurized gas uniformly urges the plastic away from one of the mold portions and against the other mold portion to inhibit shrinkage of the molded part from contact with the mold surface of the other mold portion, and can also be used to eject the part from the mold cavity, whereby to obviate the use of ejector pins which can cause surface indentations.

Advantageously, control over the gas utilized can be reclaimed to save energy costs and gas costs. The reclaimed gas can be recirculated to enhance cooling and reduce time required for the molds to cool between cycles.

A further advantage of a mold apparatus having the rib forming channels is provision of a reinforced structural part while providing a surface having a sink-free Class A finish free of permeation marks, blush marks, etc.

Additionally, gas compression of injection molded plastic allows formation of structural parts of thin and thick cross-sections.

BRIEF DESCRIPTION OF THE DRAWINGS

Other objects, features and advantages of the invention will be apparent from the written description and the drawings in which:

FIGS. 5A and 5B, 6A and 6B, 7 and 8 illustrate additional preferred embodiments of a gas seal arrangement.

FIGS. 9 and 10 are sectional elevation and plan views, taken about line 9 of the mold apparatus of FIG. 1, showing detail of a gas inlet in accordance with this invention.

FIG. 11 is a sectional elevation view, in accordance with this invention, of another embodiment of an injection mold apparatus, particularly for providing discontinuous reinforcement ribs.

FIG. 12 is a plan view taken along line 12—12 of FIG. 11 showing the stationary core side of the mold apparatus.

FIG. 13 is a perspective view of the bottom surface of a part made in accordance with the apparatus of FIGS. 11 and 12.

DETAILED DESCRIPTION OF THE PREFERRED EMBODIMENT

Figure 1:
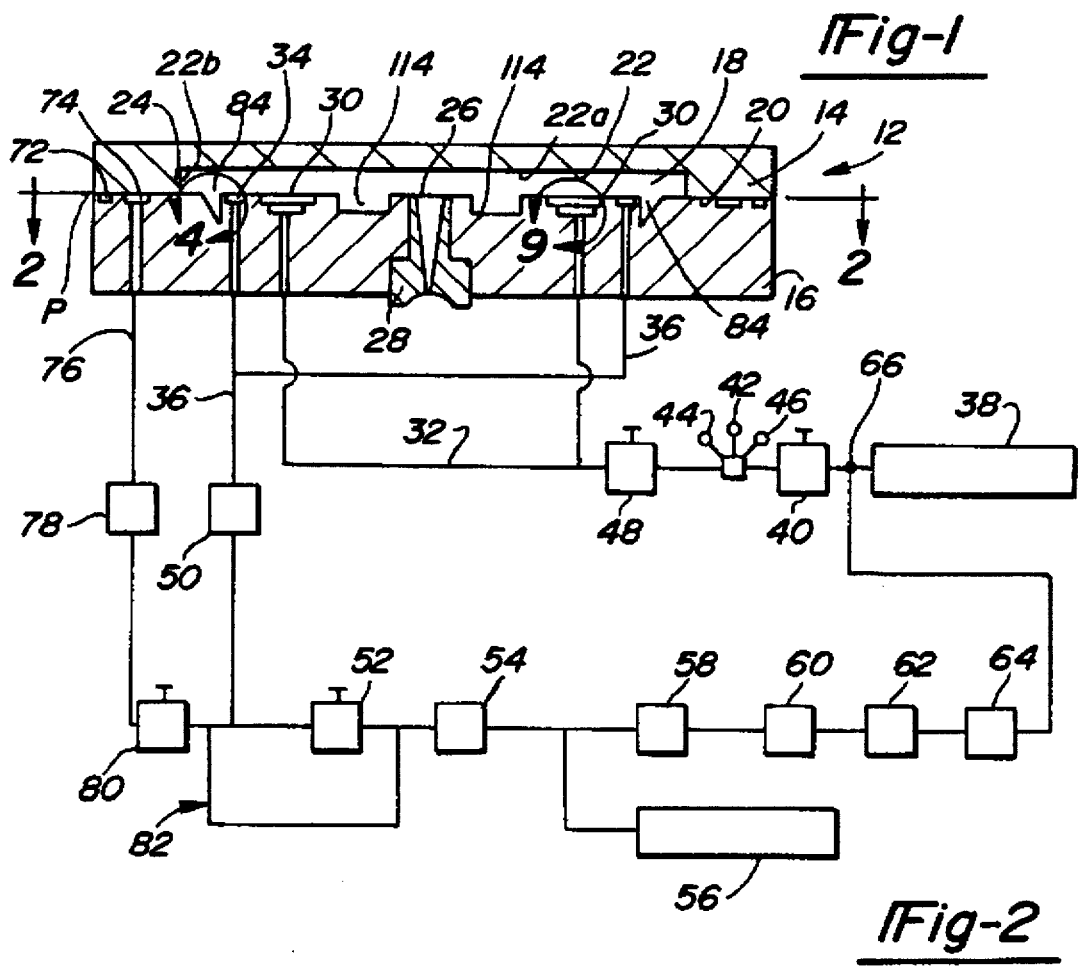
FIG. 1 is a sectional elevation view, in accordance with this invention, taken through a portion of an injection mold apparatus in a closed position to form a mold cavity and showing a recycling system to remove, save and reuse the gas.
Figure 2:
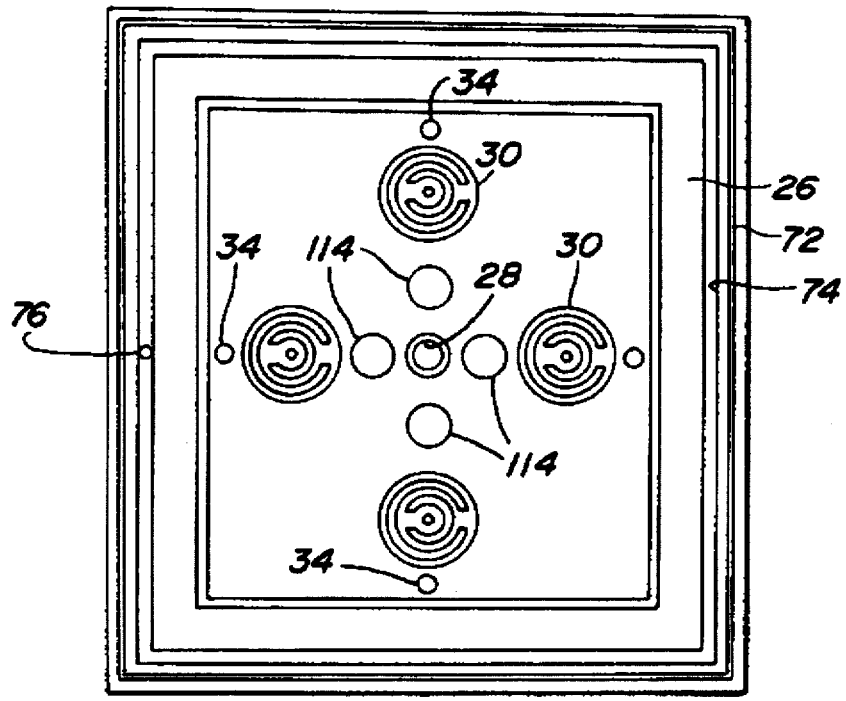
FIG. 2 is a plan view taken through the parting line of the apparatus along line 2—2 of FIG. 1, showing the stationary core side of the mold apparatus.

Referring now to the drawings, in accordance with this invention, a mold apparatus is used to form a structural part having a finished sink-free Class A exterior surface. It is to be understood that the invention could be used to form parts having different configurations, such as with or without reinforcing ribs, or with free-standing bosses, or with reinforcing ribs and free standing bosses or in combination with other structural detail, such as wall portions. Additionally, in the practice of the invention the gas can be introduced from either or both sides of the mold cavity, such as where the plastic is introduced laterally.

Figure 3:
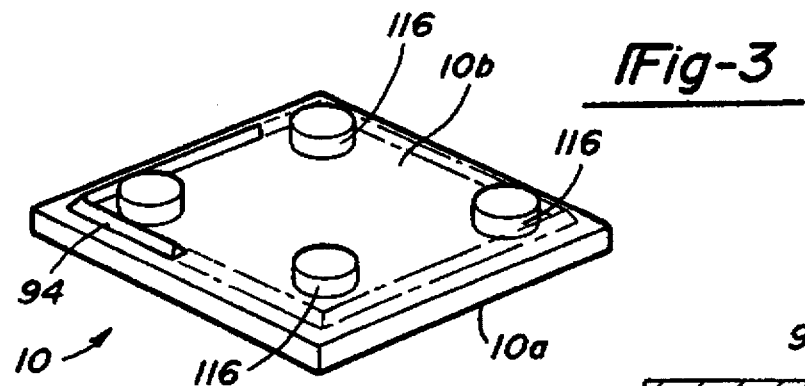
FIG. 3 is a perspective view of the bottom surface of an injection compression molded part made in accordance with the injection mold apparatus of FIG. 1.

Turning now to FIGS. 1 and 3, in accordance with this invention, a part 10 is formed by a mold apparatus 12. The mold apparatus 12 comprises movable and stationary mold portions 14 and 16, respectively, which are relatively movable between an open position (not shown), whereby the mold portions are spaced from one another and the finished part 10 can be removed, and a closed position (as shown). When the mold portions are in the closed position, the mold portions cooperate to define a mold cavity 18 for forming the part 10. While not shown, the stationary mold portion is fixed to a conventional molding machine and a conventional screw ram to receive melted plastic material injected into the mold cavity 18. Further, a clamping arrangement is connected to the mold portions for holding the mold halves together when in the closed position. The screw ram and clamping arrangement are conventional and would be understood by those skilled in the art. Illustrative are the arrangements described in the hereinabove incorporated PCT WO 90/06220.

The movable mold portion 14 has a bottom surface which comprises a first surface portion 20 which is exterior to the mold cavity and a second surface portion 22 which defines the interior of the mold cavity and forms the finished appearance surface of the desired part. As shown, the interior surface portion 22 comprises a flat upper wall 22a and an endwall 22b.

The stationary mold portion 16 has a top surface which comprises a first surface portion 24 which is exterior to the mold cavity and forms a support surface for the corresponding exterior surface portion 20 and a second surface portion 26, the exterior first surface portions 20 and 24 defining a parting line "P". The mold cavity 18 is defined by the interior surface portions 22 and 26, which are confronting. A plastic sprue bushing 28 is positioned to allow injected melted thermoplastic resin through the surface 26 and into the mold cavity. The volume of melted plastic is of a predetermined amount to substantially fill the mold cavity but of a volume less than that necessary for a complete packing. Although the volume injected could be between 90–99.9% of the total volume of the cavity, in one application, the plastic filled about 97.4% of the mold cavity total volume.

An inert pressurized gas, such as nitrogen, is injected into the mold cavity 18 through one or more gas inlets 30 located in the surface 26 of the stationary mold portion 16, whereby to pressurize the core side of the cavity and force the melted plastic material against the surfaces 22a and 22b of the movable mold portion 14. Preferably, to assure uniformity of resin distribution, the gas inlets are generally symmetrically disposed and each is connected via a gas inlet line 32 to a gas source at a predetermined pressure. While each gas inlet is shown separately connected to a common source, each inlet could be connected to a separate pressure source.

In accordance with an important aspect of the invention, a plurality of gas outlets 34 are provided (1) to reduce pressure in the cavity, and (2) to cool the part by allowing recirculation of the gas used in compression of the hot melted thermoplastic. The outlets 34 communicate with the cavity 18 via the surface 26 and allow gas to pass outwardly of the cavity via the return lines 36.

Nitrogen gas is supplied to the inlet line 32 from a source of nitrogen, shown by the pressurized bottle at 38. The bottle 38 includes a shutoff valve 40, a regulator 42, and gauges 44 and 46 respectively to indicate the process pressure and pressure in the bottle. Gas is supplied at the desired pressure via an electrically operated directional control valve 48.

A gas recycle system to remove, save and reuse the gas during and following the molding operation is provided. The return lines 36 are connected together and, in series, to a check valve 50, gas directional valve 52, a pressure reducing valve 54 and a nitrogen receiver 56. A pressure switch 58 connects the nitrogen with a cooler 60, such as a heat exchanger, a pump 62, a check valve 64, and into the supply 38 at 66. The pump 62 is used to compress (i.e., pressurize) the gas from the cavity and resupply cooled and pressurized nitrogen directly to the system. In one operation, the nitrogen gas from the source 38 was pressurized by the pump to 2,400 psi and the regulator 42 was set at 1,000 psi.

In accordance with the recapture aspect of this invention, a pair of concentric outer and inner grooves 72 and 74 are formed in the surface 24 of the mold portion 16. The outer groove 72 is sized to receive an O-ring to be compressed by the surfaces 20 and 24 and form a gas seal about the mold cavity. The inner groove 74 communicates gas in the cavity which was heated by contact with the plastic with a low pressure outlet return line 76 to the nitrogen receiver 56 via a pressure reducing valve 78, and a directional control valve 80. If desired this gas can be communicated directly into the directional valve 52, or bypass the valve 52 via bypass line 82.

Preferably and in accordance with this invention, FIGS. 4A–4B, 5A–5B, 6A–6B, 7 and 8 show a gas seal arrangement utilized to prevent gas from escaping from the mold cavity or migrating to the outer surface of the thermoplastic. After the plastic is injected into the cavity, the plastic will tend to shrink. If the injected gas should migrate from the "inner" gas compression side of the thermoplastic and into the interface formed between the mold cavity wall formed by 22a and 22b, which surfaces define the shaped finished exterior appearance surface of the part 10 (i.e., the "outer" compressed surface of the plastic), the gas will force the plastic away from the mold and destroy the formation of the Class A surface. To inhibit this from happening, a continuous recess is formed in the mold portion 16, at a remote location of the surface 26 from which gas is introduced into the cavity, and in encircling relation to the gas inlets 30. The recess will receive the thermoplastic during injection of the thermoplastic into the cavity, whereupon the thermoplastic will harden during cooling to form a continuous ring. During the cooling phase, the gas continuously forces the molten plastic against a surface of the recess to inhibit gas escape from the mold cavity, such as via the parting line closure between the mold portions.

Figure 4A:
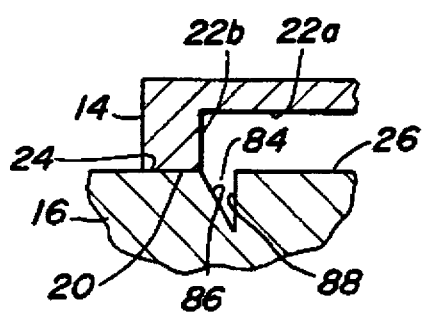
FIGS. 4A and 4B are sectional elevation views, before and after plastic injection, taken about line 4 of the mold apparatus of FIG. 1, showing formation of a gas seal arrangement to prevent gas from escaping from the mold cavity via the mold parting line or migrating from the core side to the finished surface of the part.
Figure 4B:
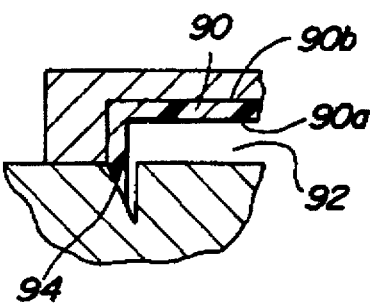

In the embodiment shown in FIG. 4A, a continuous V-shaped recess 84 is formed in the surface 26 of the mold portion 16 so as to be in encircling relation to the gas inlets 30, as well as the gas outlets 34. The recess 84 includes an inclined wall 86 which extends downwardly from the surface 26, and inwardly towards the gas inlets whereby to intersect with a vertical wall 88. In FIG. 4B, heated, melted, flowable thermoplastic 90 has been injected into the mold cavity and, in part, into the recess 84. The pressurized gas forces the outer surface 90b of the plastic toward the surfaces 22a and 22b, and forms a reduced gas cavity 92 between the surface 26 and the inner surface 90a of the thermoplastic. During cooling and while the pressure is maintained, the gas cavity part will undergo some shrinkage. However, escape of gas from the mold cavity is prevented by the action of the gas constantly forcing the plastic material against the inclined wall 86, resulting in a seal ring 94. As shown in FIG. 3, the gas seal ring is formed on the back side 10b of the part 10.

Figure 5A:
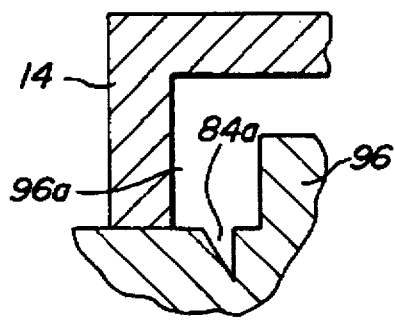
Figure 5B:
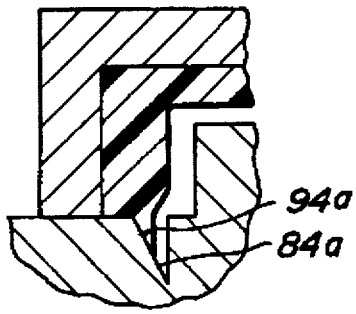

FIGS. 5A and 5B show the mold portion 16 as including a core body 96, an annulus 96a being defined between the core body and the movable mold portion 14, and a continuous V-shaped recess 84a being formed in the surface 26. Plastic driven into the recess 84a forms a seal ring 94a that prevents gas from escaping from the mold cavity or reaching the finished surface.

Figure 6A:
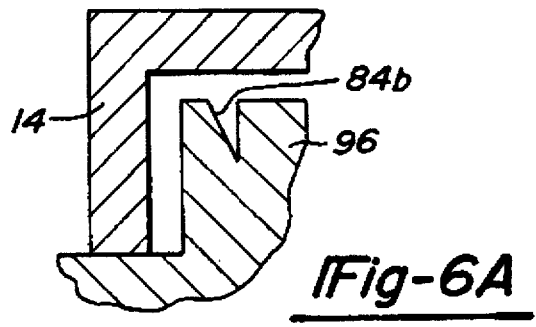
Figure 6B:
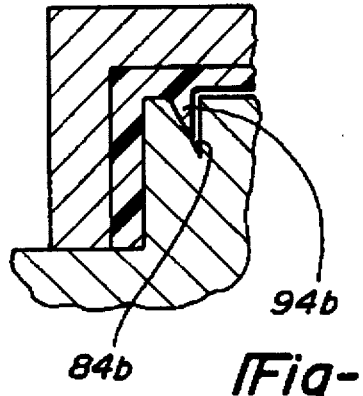

FIGS. 6A and 6B show a continuous V-shaped recess 84b being formed in an upper surface of the core body 96. In this embodiment, a cake pan-shaped article can be formed, such as that described in connection with FIGS. 11–14. A gas seal ring 94b would be formed on a back side of the part and at an unseen location adjacent to the junction between the flat and cylindrical walls of the part.

FIG. 7 is similar to FIG. 4A and show a continuous "squared" recess 84c extending vertically below the parting line. Thermoplastic is forced into the recess to form a continuous annular wall, whereby to form a seal ring 94c which prevents gas escape from the mold.

FIG. 8 is similar to FIG. 5A and the gas seal ring is formed by a flat, shallow annular recess 84d in the surface 24 and extending below the parting line surface "P", and located in part under the mold portion 14 and in the mold cavity. The annular recess 84d receives plastic and forms a continuous gas seal ring 94d. This ring would be "flash" that would be removed in a post-molding operation.

FIGS. 9 and 10, in accordance with another important aspect of this invention, show details of the novel gas inlet 30 to provide gas to the mold cavity. A plurality of concentric C-shaped wall sections 98, 100 and 102 (and associated gas passages 104, 106 and 108, extending cylindrically, and passages 103, 105 and 107, extending radially) are disposed in concentric relation in the surface 26 and the gas line 32 has its opening 33 located centrally of the central wall section 98. The wall sections are located in a chamber 110 which is in a recess 111 below the surface 26 and covered by a circular porous sintered metal disk 112. As shown, the inner and outer of the C-shaped wall sections 98 and 102 have the radial passages 103 and 107 face in a direction opposite to the direction of the radial passage 105 of the center C-shaped wall section 100. This arrangement advantageously results in a greater velocity of gas flow axially and in a swirling movement of the gas around the gas passages, which has a beneficial result on the finished surface of the part as a result of improved circulation of the gas.

The disk 112 could be of any suitable density, consistent with the pressure drop desired (i.e., a lower micron opening, the greater the pressure drop, and vice versa). While it is believed the filter disk could be between 2–40 microns, a 5 micron filter disk was found preferable.

While discrete gas inlets are shown, it is to be understood that to accomplish uniform gas pressure over the inner surface of the thermoplastic, the entire surface 26 of the stationary mold portion 16 could be provided with a series of interconnected gas flow passages and one or more associated gas inlets 33. Although a porous metal disk is described herein, a poppet valve of the type shown by the hereinabove incorporated PCT Publication No. WO 90/06220 can also be used.

Another important feature of the present invention is the capability of forming free-standing structural parts, such as reinforcement ribs or bosses needed for attachment. As shown in FIG. 1, a plurality of cylindrical recesses 114 are formed in the surface 26, which cooperate to form a corresponding series of bosses 116 which project from the bottom surface of the molded part.

The part 10 formed by the apparatus of FIGS. 1–10 is shown in FIG. 3, including on the rear (i.e., bottom) surface 10b the seal ring 94 and a series of bosses 116 encircled by the ring. The top surface shown at 10a defines the exterior appearance surface having a sink-free, Class A finish.

In accordance with this invention, a cake pan article 118 is made from a mold apparatus 120 shown in FIGS. 11–13. The apparatus comprises a stationary mold portion 122 that includes a support surface 124 and a cylindrical core body 126 extending upwardly therefrom, and a movable mold portion 128 having a recess sized to receive the core body 126 and form a mold cavity 130 therebetween. The mold portion 128 includes flat and cylindrical surfaces 132 and 134 that form the finished outer appearance surface 118a of the part. The core body 126 is generally cylindrical and includes an outer cylindrical surface 136 which confronts the cylindrical surface 134 and an upper flat surface 138 which confronts the flat surface 132. The cylindrical and flat surfaces 136 and 138 form the interior surface 118b of the cake pan-shaped part 118.

Preferably and in accordance with this invention, a plurality of rib forming chambers 140 are provided in the core body 126 for forming associated planar ribs 142 in the part 118. As shown, four chambers 140 extend radially inwardly from the outer cylindrical surface 136 and axially downwardly from the flat surface 138. The chambers stop short of the geometrical center "C" of the core body and define a pair of spaced-apart parallel sidewalls 143 and 145 and the separation between the sidewalls is about equal to or slightly less than the thickness of the cylindrical wall of the part 118

(i.e., the distance generally defined between the inner and outer surfaces 134 and 136 of the cavity). The chambers generally divide the core body 126 into four equal quadrants, each chamber being adapted to receive plastic injected into the mold cavity and each forming discontinuous ribs 142.

The upper flat surface 138 of the core body 126 could, if desired, include appropriate recesses 114 for forming freestanding bosses 116, as described in connection with the part 10. Further, the outlet from the sprue bushing 28, and the gas inlets 30 would also be provided on this surface. The inlets for the gas and plastic could be otherwise.

The structural part 118 made from the apparatus 120 comprises a cake pan-shaped member comprising a flat endwall in the form of a generally circular plate having inner and outer surfaces, a sidewall in the form of a cylindrical skirt having concentric inner and outer surfaces, a plurality of free standing bosses 116 projecting from the interior surface 118b of the endwall, and a plurality of planar ribs 142. The ribs 142 are integrally formed with the flat endwall and the cylindrical skirt and each extends generally perpendicularly downwardly from the inner surface of the endwall and radially inwardly from the inner surface of the skirt.

An important feature herein resides in the relationship of the ribs 142 to the cylindrical sidewall and flat endwall. During gas compression, to be described, the material used to form the ribs enhances the dimensional stability of the part 118 and maintains the outer surfaces and in a finished sink-free condition so as to be directly ready for post molding operations.

Figure 15:
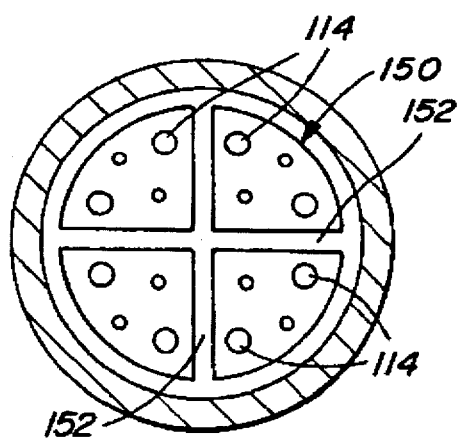
FIGS. 14 and 15 are sectional elevation and plan views, similar to FIGS. 11 and 12, showing an alternate preferred embodiment of the mold apparatus in accordance with this invention.
Figure 14:
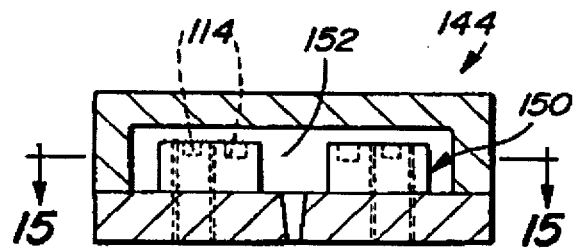
Figure 16:
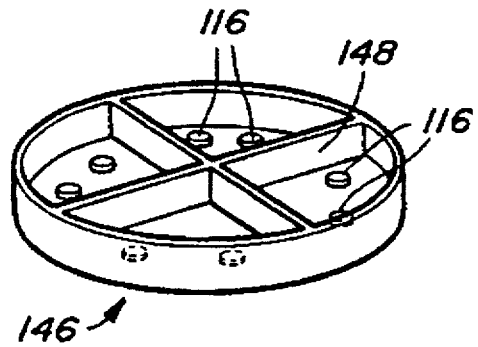
FIG. 16 is a perspective view of the bottom surface of a part made in accordance with the apparatus of FIGS. 14 and 15.

The mold apparatus 144 shown in FIGS. 14–16 forms a part 146 that is similar to the part 118 but is provided with a plurality of reinforcing ribs 148 that are continuous and intersect with one another. The core body 150 comprises four quadrants which define rib forming chambers 152 and has recesses 114 in a top surface thereof for forming bosses 116. As can be appreciated, the method herein is not restricted to the use of discontinuous ribs, such as those shown at 142 on the part 118. Importantly, both freestanding ribs 148 and bosses 116 can be provided.

Figure 17:
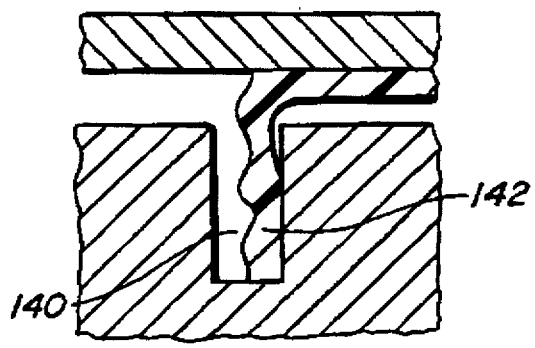
FIG. 17 is a sectional elevation view taken along line 16—16 of FIG. 12 showing a rib forming chamber divided into two halves, respectively, before and after thermoplastic and gas are introduced into the mold cavity.
Figure 18:
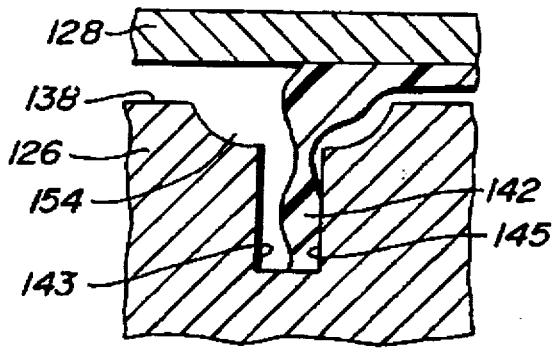
FIG. 18 is similar to FIG. 17 and shows an alternate embodiment of a rib forming chamber having a gas tributary.

FIGS. 17 and 18, show the rib forming chamber 140 as being generally rectangular and illustrate the formation of a rib 142. In each of these Figures, the chamber 140 is split into right and left halves to show the chamber before and after plastic injection.

In the right half of FIG. 17, a quantity of melted plastic compression has been injected into the mold cavity and into the rib forming chamber 140. Pressurized gas introduced into the cavity thereafter drives against the inner surface of the melted plastic and drives the plastic against the mold portion and into the chamber, whereby to form the rib 142. Thereafter, the pressure is maintained and the part allowed to cool. During cooling of the thermoplastic, the pressurized gas assures that the finished surface of the part does not have any "sink marks" resulting from material contraction adjacent the rib chamber. The gas pressure constantly forces cooling material upwardly towards the wall surface of the upper mold portion whereby to inhibit shrinking of the material adjacent the rib 142 during cooling of the part.

As illustrated in FIG. 18, and in accordance with another aspect of this invention, the flat surface 138 of the core body 126 is shown being provided with a "step" whereby each rib forming chamber 140 is formed with an increased plastic volume area 154 into which the plastic flows to drive the plastic radially outwardly and vertically upwardly against the interior surfaces of the movable mold portion. In the embodiment shown, arcuate C-shaped surface portions extend downwardly from the core surface 138 and into each of the two respective sidewalls 143 and 145 of the chamber, the surface portions forming the recessed step 154. The gas surface portions could be otherwise, such as forming a "squared step" portion.

There are no restrictions on the thermoplastic resins that can be used in the practice of the method herein. By way of illustration, the method can be applied not only to general purpose plastics such as polyolefins, polystyrene, ABS resins, AS resins, PVC resins, methacrylic resins and fluorine based resins but also engineering plastics such as nylon, saturated polyester resins, polycarbonate resins, polyacetal resins, polysulfones and modified polyphenylene ether resins. The method can also be used with fiber reinforced resins. For example, suitable ABS thermoplastic compositions would be the relatively hard polymers, such as Cycolac, a trade name of General Electric, or Krylastic, a trade name of Uniroyal.

In the method, the mold portions are closed, and the electrically controlled directional valves 48, 52 and 80 are deenergized (i.e., closed). Hot melted and flowable thermoplastic is injected through the sprue bushing 28 and into the mold cavity 18, and into the shaped recess 84, as well as into the recesses 114 and chambers 142, where such are provided. The plastic injected will be in an amount to nearly completely fill the cavity, but not fully pack the cavity. Immediately thereafter or after a timed delay, the directional control valve 48 is energized (i.e., opened) allowing gas at the desired pressure from the bottle 38 to pass through the inlet lines 32, through the gas inlets 30, and into the mold cavity. The inert gas would supplied at a pressure sufficient to urge the plastic to the opposite side of the mold from the gas inlet to completely form a solid molding having no internal voids, devoid of all shrinkage and strain marks. Before the polymer cools, gas will drive the melted plastic towards and against the respective walls of the mold recesses and chambers.

The pressure is maintained for 1–15 seconds, whereupon the gas directional valve 48 is closed (i.e., de-energized), which stops any further gas from entering the cavity and the part allowed to compression harden under the action of the gas. The gas seal ring 94 inhibits escape of gas from the cavity. The time period is sufficient to ensure that the entire "inner" surface of the plastic on the gas inlet side has sensed the equal pressure and lifted the plastic from the core side of the mold.

If it should happen that gas should pass beyond the seal ring 94 to the groove 74, the O-ring in groove 72 will stop its migration. The directional valve 80 can be energized (i.e., opened), which will direct the heated high pressure gas through return line 76 and along the path 82, around directional valve 80, and into the nitrogen receiver 56. The heated gas can be stored for reuse. Valve 80 is then deenergized (i.e., closed).

The initial gas forming pressure can be reduced to a second lower pressure, in continuous steps or intermittently, to make sure that the molding is not subject to too high a pressure during the transition from the liquid state to the solid state. This is where strain can be introduced into the molding. The reduced second pressure would still be sufficient to prevent sinkage. The heated gas removed from the mold cavity can be captured, cooled and recycled.

Accordingly, after a predetermined time, the directional valve 52 is energized (i.e., opened). The heated gas will then pass through the outlet 34, and through the directional valve 52, and into the nitrogen receiver 56.

Additionally, the gas in the mold cavity, heated by contact with the part, can desirably, be removed, cooled, and pressurized, and reintroduced as fresh ambient gas into cavity while maintaining the desired pressure in the mold cavity thereby continuously recirculating the gas to provide a cool gas flow to cool the plastic and inhibit sinkage. Without cooling of the heated plastic, sinkage can result in this regard, the directional valves 48, 52 and 80 are energized. The switch 58 is tripped, at a predetermined pressure, and the pump 62 started to raise the return gas pressure to the pressure in the bottle 38.

Following hardening of the part, the mold portions 14 and 16 are separated, whereby trapped nitrogen gas will eject, or help eject, the molding. Advantageously, this obviates any marks being formed on the surfaces as may be caused by ejector pins.

While not shown, conventional apparatus is provided to control the level and duration that the pressured gas is maintained.

In the realization of this invention, conditions such as the temperature of the molten resin during injection molding, the injection pressure, and injection speed, the injection gas timing, quantity pressure and speed, and the mold cooling time, will be selected and controlled in relation to the kind of resin being used and the shape of the mold cavity, and thus cannot be unconditionally specified. Examples are described below to illustrate the present invention.

In one sample, a cake pan-shaped part similar to that shown in FIGS. 14–16 (having discontinuous stiffening ribs) was formed. About 1–5 seconds after the ABS was injected into the mold cavity, and preferably about 2.5 seconds thereafter, the plastic injection nozzle valve was closed and nitrogen gas between 500–1,000 psi, and preferable about 650 psi, was introduced for about 5.0 seconds into the mold cavity. The gas inlet was then closed and the gas held for a period of about 30–60 seconds, and preferably about 40 seconds. Thereafter, the part was ejected.

In a second example, polypropylene was injected, as stated above, but the nitrogen gas was between 300–550 psi, and preferably was at 500 psi.

While the above-description constitutes the preferred embodiment of the invention, it will be appreciated that the invention is susceptible to modification, variation, and change without departing from the proper scope or fair meaning of the accompanying claims.

What is claimed is:

1. A gas distribution jet for substantially uniformly distributing gas supplied thereto, said jet comprising a wall having a first surface, a recess extending below said surface to form a recessed base and a cylindrical wall, a plurality of generally C-shaped wall sections disposed in concentric relation and extending upwardly from said base to form a plurality of concentric gas passages, the ends of each "C" forming a gap with the gap formed in successive of the C-shaped walls being angularly offset and forming radial gas passages, and an inlet for introducing gas into one of the gas passages.

2. A gas distribution jet for use in a plastic molding apparatus, the jet substantially uniformly distributing gas supplied thereto, said jet comprising a plurality of generally concentric, C-shaped walls that define gas passages therebetween, each of said gas passages of said gas distribution jet defined by said C-shaped walls including an inlet side, said jet further including a plenum disposed between said source of pressurized gas and said inlet side of each of said C-shaped gas passages.

3. The plastic molding apparatus of claim 2, wherein said C-shaped walls are continuous between said mold cavity and said plenum.

4. The plastic molding apparatus of claim 3, wherein said C-shaped walls include top sides and said gas jet further includes a porous disk between said top sides and said mold cavity.

5. The plastic molding apparatus of claim 2, wherein said gas passages defined by said C-shaped walls extend cylindrically and wherein each of said gas passages is connected with an adjacent gas passage by a passage positioned angularly with respect to said cylindrical passages.

6. The plastic molding apparatus of claim 5, wherein said angularly positioned passage is radially positioned with respect to said C-shaped walls.

7. A gas distribution jet adapted for fluid connection with the outlet of a source of pressurized gas for use in a plastic molding apparatus, the jet substantially uniformly distributing gas delivered thereto, said jet including a gas inlet fluidly matable with the outlet of the source of pressurized gas and a plurality of generally concentric, C-shaped walls that define gas passages therebetween, said gas distribution jet further including a center, said gas inlet being centrally disposed within said center of said jet.

\* \* \* \* \*